United States Patent [19]

Lesca et al.

[11] Patent Number: 5,368,927
[45] Date of Patent: Nov. 29, 1994

[54] BONDED ARTICLES COMPRISING A NONWOVEN FABRIC AND A POLYOLEFIN FILM AND THE PROCESS FOR THEIR PREPARATION

[75] Inventors: Giuseppe Lesca; Vincenzo Giannella, both of Milan, Italy

[73] Assignee: Himont Incorporated, Wilmington, Del.

[21] Appl. No.: 12,815

[22] Filed: Feb. 3, 1993

[30] Foreign Application Priority Data

Feb. 6, 1992 [IT] Italy .................... MI92A000233

[51] Int. Cl.⁵ .................... B32B 27/32; C08F 297/08
[52] U.S. Cl. .................... 428/288; 156/176; 428/332; 428/516
[58] Field of Search .................... 428/288, 332, 516; 156/176

[56] References Cited

FOREIGN PATENT DOCUMENTS

| | | |
|---|---|---|
| 0400333 | 12/1990 | European Pat. Off. . |
| 0444671 | 9/1991 | European Pat. Off. . |
| 0472946 | 3/1992 | European Pat. Off. . |

*Primary Examiner*—James C. Cannon

[57] ABSTRACT

Articles comprising a nonwoven polypropylene fabric bonded directly to a film of a heterophasic polymer composition comprising:

A) a polypropylene homopolymer, or a crystalline copolymer of propylene with ethylene and/or another α-olefin B) an ethylene-propylene copolymer, and C) a copolymer of ethylene with propylene and/or another α-olefin, and optionally a diene.

4 Claims, No Drawings

BONDED ARTICLES COMPRISING A NONWOVEN FABRIC AND A POLYOLEFIN FILM AND THE PROCESS FOR THEIR PREPARATION

BACKGROUND

The present invention concerns articles comprising a polypropylene nonwoven fabric (NWF) bonded with a polyolefin film, and the process for their preparation.

Articles consisting of a thin nonwoven fabric bonded with polyolefin film are well known and commercially available and are found in a number of applications, for example coverstock for sanitary napkins, gowns and protective clothing for the medical sector, disposable tablecloths and sheets. The material which forms the thin NWF is obtained from polypropylene fibers, cohered by passing them through a carding machine ("card web"), or thermosealed by way of calendering.

The films used for the production of the above mentioned articles consist of homo- and copolymers of ethylene, particularly low density polyethylene (LDPE), linear low density polyethylene (LLDPE), ethylene/vinyl acetate copolymers (EVA), high density polyethylene (HDPE), or a mixture of two or more of said polymers.

In order to achieve an effective bond between the two layers (NWF and film) by using the above mentioned materials, one needs to interface said layers with adhesives, such as hot melt, or solutions or emulsions of adhesive substances. These measures, however, present some inconveniences: they introduce solvent residues into the article (if one uses the above adhesive substances) which are undesirable for use in sanitary/hygienic applications; they cause the article to be more rigid, paper-like and noisy, where the desirable qualities are usually softness, flexibility and noiselessness.

A technically and economically attractive alternative would be the bonding of two layers by thermobonding, optionally using the thermosealing by points method. This type of sealing, however, is very difficult because of the different chemical nature of the two layers. Only by using high temperatures and long periods of time could one partially achieve said bonding (with poor results), by causing the partially melted film to penetrate the NWF; however, the article obtained with this method would be even more rigid and paper-like than the one produced by using the adhesives.

SUMMARY OF THE INVENTION

The articles of the present invention comprise a polypropylene nonwoven fabric bonded directly to a film made of a heterophasic polymer composition comprising (percentage by weight):

A) 10–60%, preferably 20–50%, of polypropylene homopolymer with an isotactic index (percentage by weight of fraction insoluble in boiling n-heptane) higher than 80, preferably between 90 and 98, or crystalline copolymer of propylene with ethylene and/or an α-olefin having 4–10 carbon atoms, containing 85% or more of propylene and having an isotactic index of ≧80;

B) 3–25% of ethylene-propylene copolymer, preferably containing from 0.5 to 5% of propylene, insoluble in xylene at ambient temperature;

C) 15–87%, preferably 30–75%, of a copolymer of ethylene with propylene and/or an α-olefin having 4–10 carbon atoms, and optionally a diene, containing 20–60% of ethylene and completely soluble in xylene at ambient temperature.

According to the present invention it has been found that by using a film made of the heterophasic polymer composition defined above it is possible to obtain the direct bonding of the two layers by thermobonding at temperatures lower than the melt temperature for both layers. The term "direct bonding", in connection with the articles of the present invention, refers to the fact that the two layers (NWF and film) are bonded together by heat sealing without the need for adhesives.

DETAILED DESCRIPTION

In the articles of the present invention, in the case where copolymer (C) of the heterophasic polymer composition comprises a diene, the latter is present preferably in quantities lower than or equal to 10% by weight. Examples of preferred dienes are: 1,4-hexadiene; dicyclopentadiene; and 2-ethylidene-5-norbornene.

Examples of preferred α-olefins having 4–10 carbon atoms that can be present in (A) and in (C) are: 1-butene, 4-methyl-1-pentene and 1-hexene.

The polypropylene fiber used for the preparation of the nonwoven fabric can be any of the commercially available heat sealable fibers, generally comprising crystalline polymers, in particular homopolymers having melt index values (230° C., 2.16 Kg, ASTM D1238 method, condition L) of 10–30 g/10 min and an isotactic index of ≧85.

The heterophasic polymer compositions used for the films used in the articles of the present invention are preferably prepared by way of sequential polymerization in two or more stages, using highly stereospecific Ziegler-Natta catalysts. Component (A) is formed in the first stages of polymerization, preferably in liquid monomer, while (B) and (C) are formed in one or more subsequent polymerization stages.

The catalysts that can be used in particular are those comprising the reaction product of a solid component containing a titanium compound and an electron-donor compound (internal donor) supported on activated magnesium chloride, with an Al-trialkyl compound and an electron-donor compound (external donor). Preferably, the titanium compound used is the $TiCl_4$. The internal donor is preferably selected from the alkyl, cycloalkyl or aryl phthalates, such as for example diisobutyl, di-n-butyl and di-n-octyl phthalate.

The external donor is selected preferably from the silicon compounds containing one or more -OR groups, where R is a hydrocarbon radical. Specific examples are diphenyldimethoxysilane, dicyclohexyldimethoxysilane, methyltert-butyldimethoxysilane diisopropyldimethoxysilane and phenyltriethoxysilane.

Examples of the above mentioned heterophasic polypropylene compositions, as well as the catalysts and polymerization processes commonly used for their preparation are described in published European patent applications 400 333 and 472 946.

The heterophasic composition of the invention can also be obtained by mechanical blending of component (A), which is prepared separately, and products (B) and (C).

The product of (B)+(C) can be obtained by copolymerizing ethylene with propylene and/or an α-olefin having 4–10 carbon atoms, and optionally a diene, in the presence of a catalyst of the types described above.

Processes suitable for use in producing the film of the above heterophasic compositions are those known in the art and are, for example, blow-molding, cast-extrusion and bioriented-extrusion. For the purpose of the present invention, the thickness of the films is preferably from 10 to 50 μm. Examples of films obtained from heterophasic compositions of the type described above are given in published European patent application n. 444 671.

In order to prepare the articles of the present invention, the polypropylene film and the NWF are heat sealed operating at a temperature preferably ranging from 90° to 140° C. Because of the particular physicochemical nature of the film material, these temperature conditions are sufficient to cause the bonding of the two layers, and provide a product with good flexibility, noiselessness, softness, pleasing touch, and freedom from solvents and/or adhesive substances.

The heat-seal operation is carried out according to known techniques, overlapping the two layers, and using a calender, or another device which allows the effective compression of one layer against the other at an appropriate temperature.

The following examples are given in order to illustrate, and not limit, the present invention.

Example

By using the blow-molding technology normally adopted for the commercial production of film from low density polyethylene (LDPE), one prepares a film with a thickness of 15 micrometers using a polymer composition prepared by way of sequential polymerization, having a melt index of 0.8 g/10 min (230° C. 2.16 Kg, ASTM D1238, condition L) and consisting of (percentage by weight):

A) 30% of propylene/ethylene copolymer with an ethylene content of 1.6%;
B) 5% of ethylene/propylene copolymer, insoluble in xylene at 20° C. and with a propylene content of about 0.8%;
C) 65% of propylene/ethylene copolymer, soluble in xylene at 20° C. and with an ethylene content of 26%.

Separately, using a calender which comprises one smooth roller and one embossed roller, one prepares a nonwoven fabric with an average denier equal to 20 g/m$^3$, using polypropylene staple having an tenacity = to 1.7 dtex, and average length =40 mm, obtained from a polypropylene homopolymer with an isotactic index =96 and melt index =12 g/10 min.

The film and the nonwoven fabric described above are then subjected to bonding using the same calender that was used to produce the nonwoven fabric, to which has been added a film-feeding device. The film and the nonwoven fabric are fed respectively in contact with the smooth roller and the embossed roller. The speed with which the film and the NWF are fed is maintained constant, throughout the test, at 70 m/min; the temperature of the smooth roller is 105° C., while that of the embossed roller is 125° C. The bonding of the two layers is excellent, and the article obtained, with a denier of about 30 g/m$^2$, is very flexible, soft and noiseless.

Some mechanical characteristics of the article obtained are reported below.

| | FILM USED | BONDED PRODUCT |
|---|---|---|
| TENACITY (N/5 cm) (UNI 8639/84) | | |
| lengthwise | 18 | 45 |
| crosswise | 7 | 10 |
| ELONGATION AT BREAK (%) (UNI 8639/84) | | |
| lengthwise | 240 | 83 |
| crosswise | >400 | 76 |

Example 2 (Comparative)

Example 1 is repeated by bonding the same nonwoven with a 15 micrometers thick film made of LDPE having a melt index (190° C., 2.16 Kg, ASTM D 1238, condition E) equal to 6 g/10 min, and density of 0.92 g/cm$^3$, prepared by blow-molding. By carrying out the calendering at a speed of 70 m/min, with an embossed roller temperature of 125° C. and smooth roller temperature of 105° C., the resulting bond is very poor, and the two layers can be separated from one another by hand.

The poor bonding result does not change even when the calendering speed is reduced to 40 m/min. At this point the temperature of the embossed roller is increased to 135° C., thus causing the melting (even if partial) of the polyethylene film. However, even with these drastic measures one cannot obtain adequate adhesion of the two layers, which again can be easily separated by hand. Therefore the material obtained is not characterized.

We claim:
1. A flexible, soft and noiseless article comprising nonwoven polypropylene fabric directly bonded to a film of a heterophasic polymer composition comprising:
   A) 10–60% of polypropylene homopolymer with isotactic index higher than 80, or crystalline copolymer of propylene with ethylene and/or an α-olefin having 4–10 carbon atoms, containing 85% or more of propylene and having isotactic index of ≧80;
   B) 3–25% of ethylene-propylene copolymer insoluble in xylene at ambient temperature; and
   C) 15–87% of a copolymer of ethylene with propylene and/or an α-olefin having 4–10 carbon atoms, and optionally a diene, containing 20–60% of ethylene, and completely soluble in xylene at ambient temperature.

2. The article of claim 1, wherein said nonwoven polypropylene fabric is made of fibers of a homopolymer of propylene having a melt index pursuant to ASTM D1238, 230° C., 2.16 kg, condition L of 10–30 g/10 min and isotactic index of ≧85.

3. The article of claim 1, wherein said film has a thickness of 10 to 50 μm.

4. A process for the preparation of the article of claim 1, comprising heat sealing said nonwoven polypropylene fabric with said heterophasic polymer composition film at temperatures ranging from 90 to 140° C.

* * * * *

UNITED STATES PATENT AND TRADEMARK OFFICE
CERTIFICATE OF CORRECTION

PATENT NO. : 5,368,927
DATED : November 29, 1994
INVENTOR(S) : Giuseppe Lesca et al.

It is certified that error appears in the above-identified patent and that said Letters Patent is hereby corrected as shown below:

Col. 4, line 37, before "nonwoven" insert --a--.

Col. 4, line 38, after "comprising" insert --(percentage by weight)--.

Signed and Sealed this

Fourth Day of July, 1995

BRUCE LEHMAN

*Attest:*

*Attesting Officer*      *Commissioner of Patents and Trademarks*